Aug. 25, 1959   N. FRANTZ   2,901,565
WIRE-FORM CURRENT CONTROL DEVICE
Filed April 11, 1957
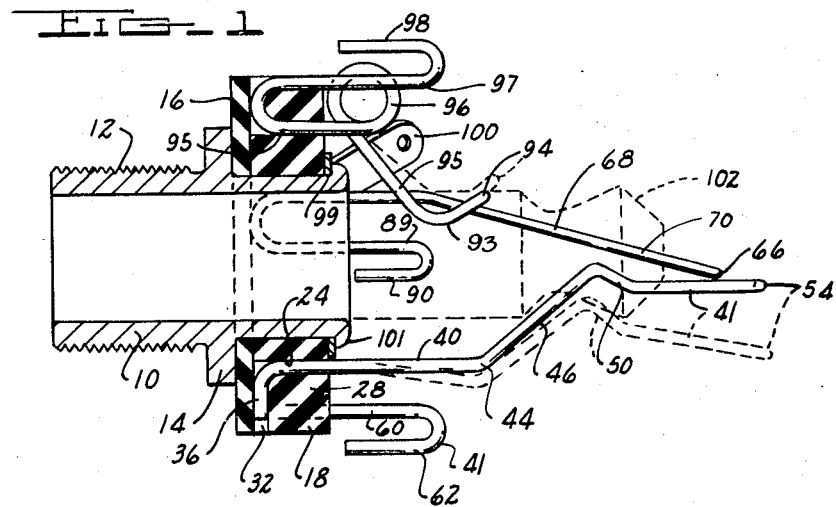
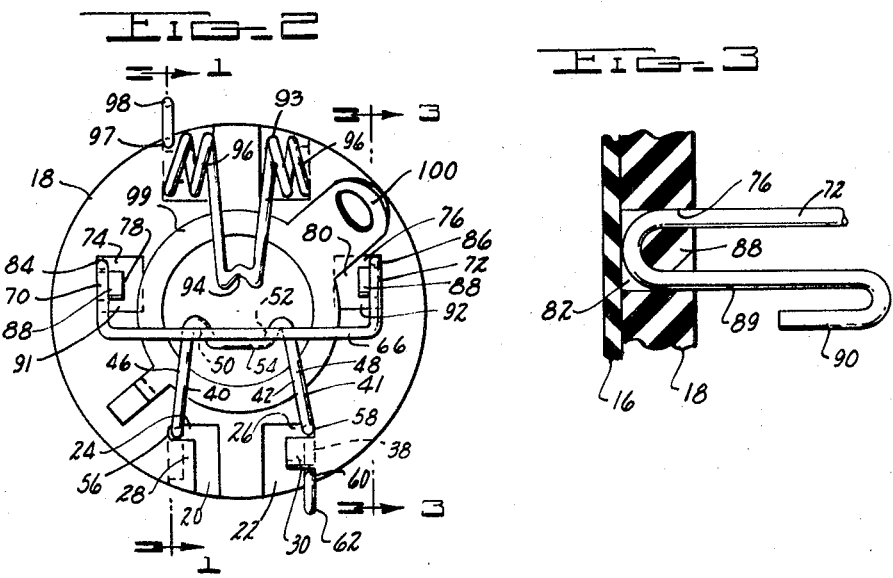
INVENTOR
NICHOLAS FRANTZ
SMITH, OLSEN, LEWIS & M<sup>c</sup>RAE
ATTORNEYS

United States Patent Office 2,901,565
Patented Aug. 25, 1959

2,901,565

WIRE-FORM CURRENT CONTROL DEVICE

Nicholas Frantz, Chicago, Ill., assignor to Carter Parts Company, Skokie, Ill., a corporation of Illinois Application April 11, 1957, Serial No. 652,199

11 Claims. (Cl. 200—51.1)

This invention relates to electric current control devices, and particularly "wire-form" jacks.

Objects of the invention are to provide a "wire-form" current control device wherein:

(1) The component parts can be assembled together quickly by untrained personnel without danger of upsetting the assembly during the final connection operation, (2) The "wire-form" elements in their operative positions are fulcrumed at substantial distances from their actuation points, thereby providing a design having a large working gap between elements so as to require less adjustment on the production line to correct any production deviations, (3) The component parts are low cost items producible with relatively small tolerance variations, (4) The wire-form parts may be reversed, replaced and interchanged to provide varying circuit-control combinations utilizing the same mounting structure, (5) The wire-form parts have a smooth action and camming ride on the mating plug with a very low distributed electrostatic capacity between conducting circuits, (6) The device can be constructed in relatively small sizes, (7) The composite design of the wire-form elements and mounting structure is such that forming operations can be performed progressively on conventional forming equipment with only a single secondary connection operation being required to retain all of the components in their assembled positions.

Other objects of this invention will appear in the following description and appended claims, reference being had to the accompanying drawings forming a part of this specification wherein like reference characters designate corresponding parts in the several views.

In the drawings:

Fig. 1 is a sectional view taken substantially on line 1—1 in Fig. 2 showing one embodiment of the invention.

Fig. 2 is a top plan view of the Fig. 1 embodiment, and

Fig. 3 is a sectional view on line 3—3 in Fig. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown an electrical jack comprising a metal mounting sleeve 10 which is provided with threads 12 for its securement on a suitable support structure (not shown). Sleeve 10 includes an annular shoulder 14 on which is received an annular flat insulator washer 16 formed of phenolic material. Positioned on washer 16 is a phenolic insulator body 18.

Body 18 is provided with two parallel slots 20 and 22 which extend completely through the body to the face of washer 16. Second slots 24 and 26 extend angularly from slots 20 and 22 completely through body 18. Insulator body portions 28 and 30 within the angle encompassed by the interconnected slots are undercut as shown by way of example at 32 to define lip portions or lugs.

Undercuts or lugs 32 receive the angularly turned sections 36 and 38 of legs 40 and 42 which form parts of a spring element 41. Legs 40 and 42 extend through slots 24 and 26 in parallel directions until they reach points 44, after which they converge toward one another and toward the axis of sleeve 10, as at 46 and 48. Legs 40 and 42 then continue their "convergence" but extend away from the axis of sleeve 10, as at 50 and 52. The extreme upper ends of legs 40 and 42 are interconnected by a web portion 54.

Assembly of spring element 41 into insulator body 18 is accomplished by inserting turned sections 36 and 38 into slots 20 and 22, and then allowing the legs 40 and 42 to expand apart until they seat against the end walls 56 and 58 of slots 20 and 22. Prior to its assembly into the insulator body the spring element is formed with its legs 40 and 42 spaced apart about twice the distance shown in Fig. 2. As a result, when sections 36 and 38 are positioned in slots 20 and 22 they automatically spring apart to seat against end walls 56 and 58. Lips or lugs 28 and 30 prevent the spring element from pulling out of the insulator body.

Spring element 41 is a current-carrying element, and it is accordingly formed with an electric terminal which consists of an upwardly turned section 60 and reversely turned section 62 to which an electric conductor can be attached.

The upper end portions of spring element 41 contact the web portion 66 of a second spring element 68. Element 68 is provided with legs 70 and 72 which extend downwardly into slots 74 and 76. Slots 74 and 76 interconnect with slots 78 and 80 and cut away portions 82 (Fig. 3). Cut away portions 82 are formed in the undersurface of the insulator body portions encompassed by the interconnected slots 74, 76, 78 and 80.

Assembly of element 68 onto the insulator body is accomplished by inserting the lower end portions of legs 70 and 72 into slots 78 and 80, and allowing the legs to spring apart against slot end walls 84 and 86 in the same manner as legs 40 and 42. Lips or lugs 88 (formed by undercuts 82) prevent pull out of the spring element. The lower end portion of leg 72 is formed with an electric terminal which consists of an upwardly turned section 89 and reversely turned section 90 to which another electric conductor can be attached. The lower end portion of leg 70 is cut off in the same manner as leg 46 of element 41.

In some instances it is desirable to reverse the position of element 68, i.e. to reverse the positions of legs 70 and 72 so as to locate web portion 66 on the opposite side of the axis of sleeve 10. Slots 92 and 91 accommodate the respective lower end portions of legs 70 and 72 in the desired "reversed" position.

A third spring element 93 is positioned diammetrically across from element 41. Element 93 includes a web portion 94 and leg portions 95, which extend downwardly into the same type slots and undercuts as are employed in conjunction with element 41. Leg portions 95 include coiled sections 96, which act as a torsion spring to bias web portion 94 toward the axis of sleeve 10. One of the legs 95 is turned upwardly at 97 and reversely at 98 to provide an electric terminal to which an electric conductor can be attached. Legs 95, as initially formed, are spaced apart a greater distance than that shown in Fig. 2 so as to pressure against the slot end walls in their assembled positions in the same manner as legs 40, 42, 70 and 72.

Sleeve 10 carries a flat, annular, metal disk 99 which is equipped with a terminal-forming extension 100 to which a ground wire can be attached. Final assembly of members 10, 16, 18, 41, 68, 93 and 99 is effected by staking over the end of sleeve 10 at 101.

The finally assembled device is employed with a conventional plug 102 (shown in phantom lines in Fig. 1) which may have a dielectric outer surface interrupted by one or more electric conductive ring sections adapted to engage one or more of the spring elements. The ring sections are electrically connected to conductors extending axially into the plug 102. Insertion of the plug through sleeve 10 causes its "ring section" to make the circuit through element 93 and its "tip section" to break the circuit through elements 41 and 68. The camming action of the plug on elements 41 and 93 is comparatively smooth so that various ones of elements 41, 68 and 93 may be reversed, interchanged or removed for varying the circuitry without altering the element construction or production conditions.

The manner of constructing wire elements 41, 68 and 93 as "spring" elements, and utilizing the angularly directed slots and undercuts causes them to be securely retained throughout the entire sequence of assembly operations without attention on the part of persons handling the devices.

Each of the wire elements is fulcrumed or mounted at a substantial distance from its point of engagement with the plug or adjacent element. As a result large "working gaps" can be provided, and adjustments to correct for "gap variations" are at a minimum.

I claim:

1. In an electrical jack adapted to receive a plug, an insulator body having a central opening and a pair of spaced slots extending lengthwise in the outer wall of said body, said body having adjacent its one end lugs projecting into said slots in opposed lateral directions, a generally U-shaped resilient contact element having its leg portions extending respectively into said spaced slots and its mid-portion projecting axially away from said body and inwardly toward the axis of said opening for engagement by said plug, the terminal ends of said leg portions partially encircling said lugs and being urged laterally thereonto by resilient properties in said contact element, one of said terminal ends projecting outwardly from said body to serve as an electric terminal so that an electric circuit can be closed between said plug and said electric terminal when the plug is inserted through the opening in said body into contact with said mid-portion.

2. In an electrical jack adapted to receive a plug, an insulator body having a central opening and a pair of spaced slots extending lengthwise in the outer wall of said body, said body having adjacent its one end lugs projecting into said slots in opposed lateral directions, a generally U-shaped resilient contact element having its leg portions extending respectively into said spaced slots and its mid-portion projecting axially away from said body and inwardly toward the axis of said opening for engagement by said plug, the terminal ends of said leg portions partially encircling said lugs and being urged laterally thereonto by resilient properties in said contact element, one of said terminal ends projecting outwardly from said body to serve as an electric terminal so that an electric circuit can be closed between said plug and said electric terminal when the plug is inserted through the opening in said body into contact with said mid-portion, an annular dielectric member mounted over said one end of said body closing one end of each of said slots to aid in retaining said resilient contact in place, and a tubular member having an outwardly projecting shoulder intermediate its ends seated on said annular dielectric member and having its end clinched over the other end of said body thereby securing the component parts together.

3. An electrical jack as defined in claim 2 wherein an annular disk is clamped between said body and the clinched end of said tubular member, said annular disk carrying a ground terminal in electric connection with said tubular member.

4. A normally closed electrical jack adapted to receive a plug comprising an insulator body having a central opening and a first pair of spaced slots extending lengthwise in the wall of said body, said body having adjacent its one end lugs projecting into said slots, a first generally U-shaped resilient contact element having its leg portions extending respectively into said spaced slots and having its mid-portion projecting axially away from said body and inwardly toward the axis of said opening for engagement by said plug, said body having a second pair of spaced slots symmetrically disposed on the opposite side from the first pair of spaced slots and having lugs projecting into the second pair of slots, a second generally U-shaped resilient contact element having its leg portions extending respectfully into the second pair of spaced slots and having its mid-portion projecting toward the mid-portion of the first contact element into engagement therewith, both of said contact elements having their leg portions partially encircling their associated lugs and each of said contact elements having one of its terminal ends projecting outwardly from said body to serve as an electric terminal so that a circuit through said electric terminal normally will be closed until opened by a plug being inserted in said opening to separate said contact elements.

5. In a multi-contact electrical jack adapted to receive a plug, an insulator body having a central opening and a first pair of slots extending lengthwise in the wall of said body, a first generally U-shaped resilient contact element having its leg portions extending respectively into said slots and having its mid-portion projecting axially away from said body and inwardly toward the axis of said opening for engagement by said plug, said body having a second pair of spaced slots oppositely disposed from the first pair of spaced slots, a second generally U-shaped resilient contact element having its leg portions extending respectfully into the second pair of spaced slots and having its mid-portion projecting toward and into engagement with the mid-portion of the first contact element, said body having a third pair of slots extending lengthwise, a third generally U-shaped resilient contact element having its leg portions extending respectively into the third pair of spaced slots and having its mid-portion extending inwardly but axially spaced from the mid-portions of the first two named resilient contact elements so as to be adapted to contact said plug at a remote position from the first named contact elements, each of said contact elements having one of its leg portions extend away from said body to function as an electric terminal.

6. A multi-contact electrical jack adapted to receive a plug comprising an insulator body having a central opening and a first pair of slots extending lengthwise in the wall of said body, a first generally U-shaped resilient contact element having its leg portions extending respectively into said slots and having its mid-portion projecting axially away from said body and inwardly toward the axis of said opening for engagement by said plug, said body having a second pair of spaced slots oppositely disposed from the first pair of spaced slots, a second generally U-shaped resilient contact element having its leg portions extending respectfully into the second pair of spaced slots and having its mid-portion projecting toward and into engagement with the mid-portion of the first contact element, said body having a third pair of slots extending lengthwise, a third generally U-shaped resilient contact element having its leg portions extending respectively into the third pair of spaced slots and having its mid-portion extending inwardly but axially spaced from the mid-portions of the first two named resilient contact elements so as to be adapted to contact said plug at a remote position from the first named contact elements, each of said contact elements having one of its leg portions extend away from said body to function as an electric terminal, said body having a plurality of lugs projecting into said slots, said leg portions encircling at least a portion of the lugs in their respective slots, a dielectric ring seated over the one end of said body to prevent removal of said contact elements from said one end, and a tubular member extending through the opening in said body and clamping together said dielectric ring and said body.

7. A multi-contact electrical jack as defined in claim 6 wherein a ground terminal is carried by said tubular member.

8. A multi-contact electrical jack as defined in claim 6 wherein the lugs in each pair of slots project laterally in opposite directions, and said contact elements are formed from resilient material and partially encircling said lugs, the respective pairs of leg portions being retained in a state of compression between the walls of the slots from which the lugs project.

9. A multi-contact electrical jack adapted to receive a plug comprising an insulator body having a central opening and a plurality of pairs of slots extending lengthwise in the walls of the body, a plurality of generally U-shaped resilient contact elements each having its leg portions extending respectfully into a pair of slots and its mid-portion projecting axially away from one end of said body and inwardly toward the axis of said opening for engagement by said plug when the latter is inserted through said opening, lugs projecting laterally into said slots and over which said leg portions make a bend, a dielectric ring fitted over the other end of said body closing the ends of the slots, a tubular member fitting into the opening in said body and having means for clamping the body and the dielectric ring together.

10. A multi-contact electrical jack as defined in claim 9 wherein said lugs terminate short of the opposite sides from which they project, and said contact elements are removable by urging the leg portions in the direction of projection of their respective lugs and then pulling the leg portions through the slots from the said one end of said body.

11. A multi contact electrical jack as defined in claim 9 wherein one of said contact elements has coils formed in its leg portions tending to oppose outward deflection of said mid-portion by said plug.

References Cited in the file of this patent

UNITED STATES PATENTS

| | | |
|---|---|---|
| 1,530,640 | Batchelder | Mar. 24, 1925 |
| 1,620,755 | Carter | Mar. 15, 1927 |
| 2,022,669 | Keefe | Dec. 3, 1935 |
| 2,703,393 | Bird | Mar. 1, 1955 |